Nov. 15, 1955  E. J. HAZEN  2,723,529
EMERGENCY CONTROL DEVICE FOR GAS TURBINES
Filed Feb. 6, 1948  4 Sheets-Sheet 1

INVENTOR.
EDWARD J. HAZEN
BY
-ATTORNEY-

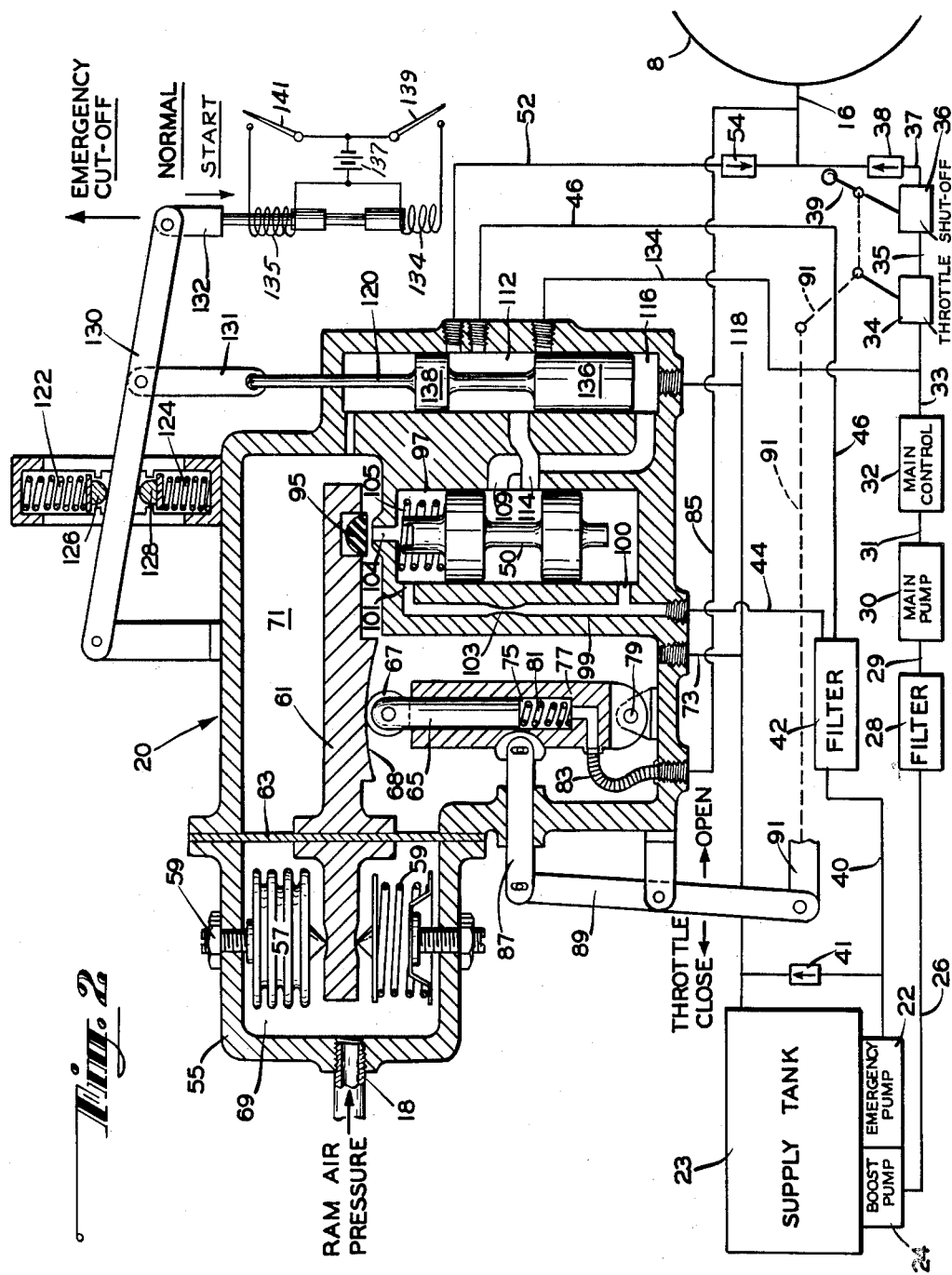

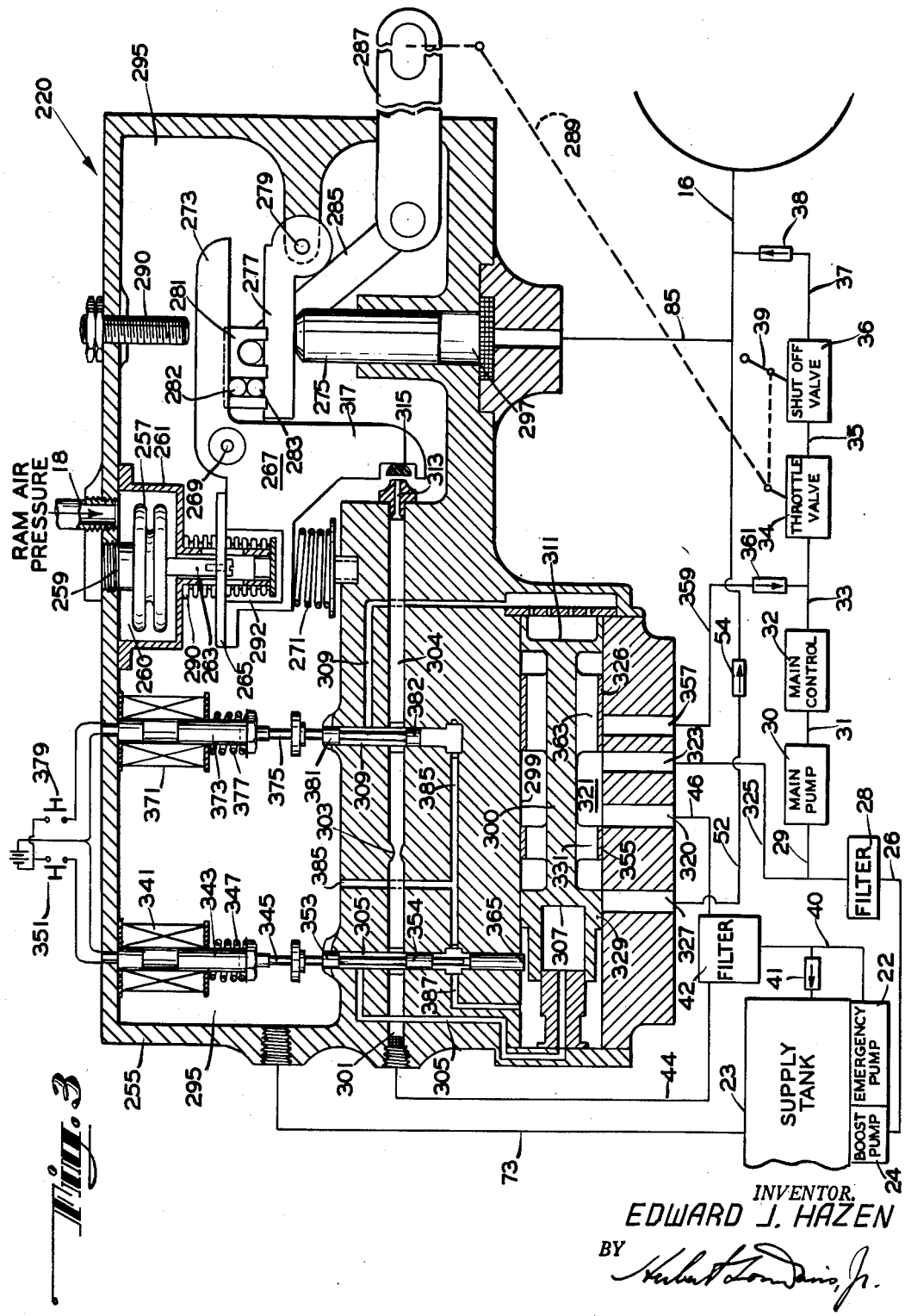

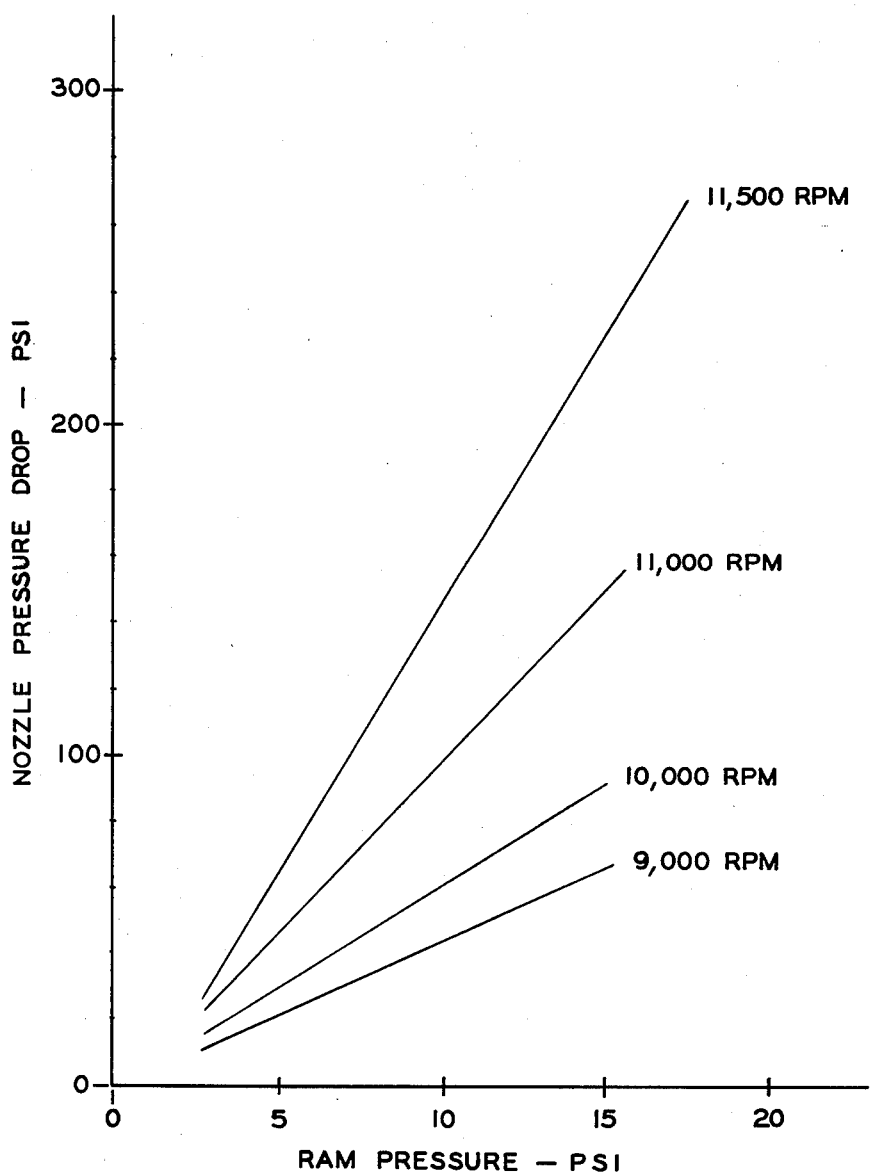

United States Patent Office 2,723,529
Patented Nov. 15, 1955

2,723,529

EMERGENCY CONTROL DEVICE FOR GAS TURBINES

Edward J. Hazen, Ridgewood, N. J., assignor to Bendix Aviation Corporation, Teterboro, N. J., a corporation of Delaware Application February 6, 1948, Serial No. 6,658

12 Claims. (Cl. 60—39.28)

The present invention relates to an automatic control for use in an emergency fuel supply system of a jet propelled aircraft.

More particularly the invention relates to an automatic control for use in a system including a main pump and an emergency pump in which the automatic control is arranged to by-pass the delivery from the emergency pump until the fuel nozzle pressure drops below a predetermined fuel pressure-ram pressure ratio. In the latter event the automatic control connects the emergency pump directly together with the main pump to the fuel nozzle. However, upon the nozzle pressure increasing to a value in excess of the predetermined ratio, the emergency pump is once again by-passed.

The fuel supply system in which the automatic control is designed for use is described and claimed in U. S. application Serial No. 494,944, filed March 17, 1955, by Edward J. Hazen as a division of the present application.

It has been found that the calculated fuel requirements in terms of nozzle pressure plotted against ram or inlet air pressure to the combustion chamber of the jet engine is essentially linear for any given turbine rotor speed. An object of the invention, therefore, is to provide a lever mechanism in the subject automatic control, whereby the two pressures may effectively be balanced.

Another object of the invention is to provide a control mechanism in which the ratio between fuel nozzle pressure and the ram air pressure to the jet engine may be utilized to regulate the fuel nozzle pressure, to control an emergency pump for supplementing the nozzle pressure and further to provide a fluid pressure medium for operating the control mechanism.

Another object of the invention is to provide a novel control mechanism having electromagnetic means operating separate control valves, in which one of the control valves is arranged so as to effect a direct connection of the emergency pump into the fuel supply system so as to supplement the fuel supply from the main pump to the nozzle and a second valve to effect connection of the emergency pump to drain rather than to the fuel nozzle.

Another object of the invention is to provide a novel control mechanism, including a novel three position selector valve arranged to selectively connect the emergency fuel pump to the fuel nozzle, inlet of the main pump or directly to the drain line.

Another object of the invention is to provide a control mechanism having a novel compact arrangement.

Another object of the invention is to provide a control mechanism, including a novel lever arm with a manually adjustable caged ball bearing for differentially connecting a first and second condition responsive means to a servo valve.

Another object of the invention is to provide a control mechanism including a differential lever arm and a piston responsive to fuel pressure serving as an adjustable control for the lever arm.

Another object of the invention is to provide a novel manually adjustable member for pivoting the latter piston.

The above and other objects and features of the invention will appear more fully hereinafter from a consideration of the following description taken in connection with the accompanying drawings wherein two embodiments of the invention are illustrated by way of example.

In the drawings:

Figure 2 is a sectional view of the control mechanism with a schematic showing of its connection into the fuel system for the jet engine.

Figure 3 is a sectional view of a modified form of the control mechanism with a schematic showing of its connection into the fuel system.

Figure 4 is a diagram showing the calculated fuel requirements in terms of nozzle pressure plotted against ram or inlet air pressure.

Figure 1:
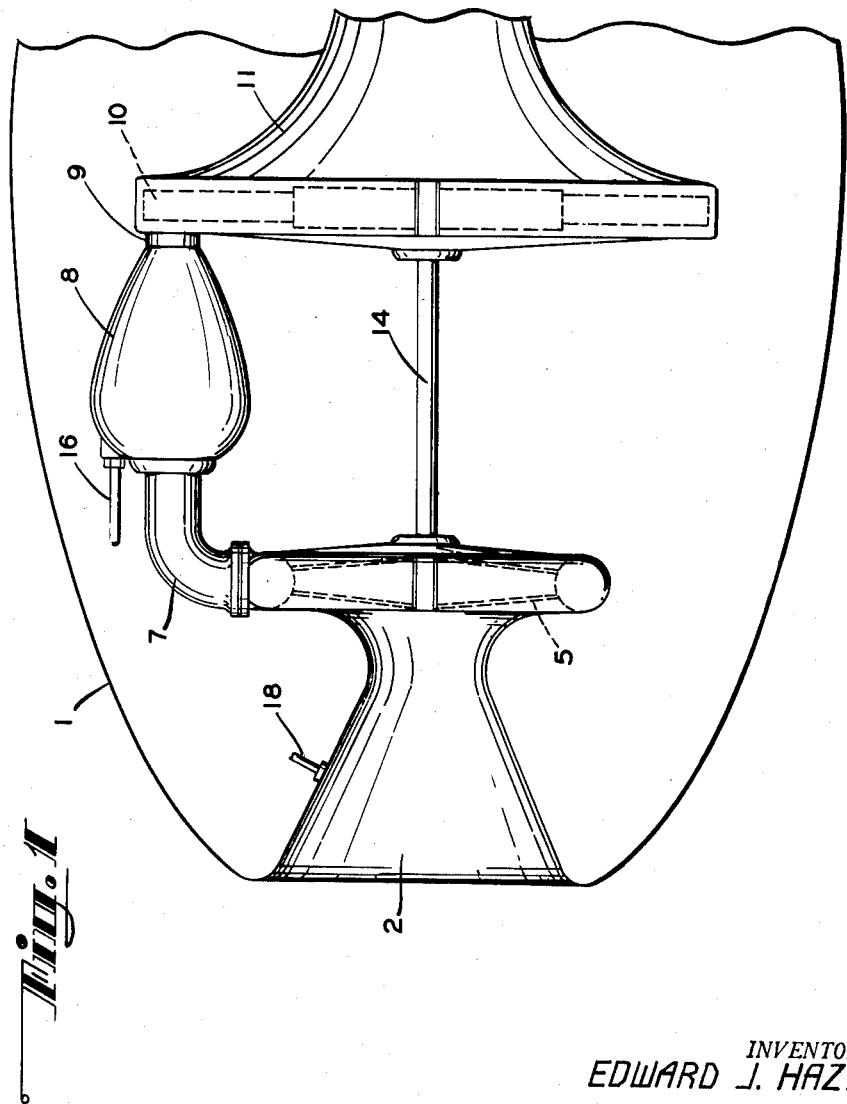
Figure 1 is a diagrammatic view of a jet propelled aircraft or guided missile with which the control mechanism is designed for use.

Referring to the drawing of Figure 1, there is indicated by the numeral 1 a jet propelled aircraft or guided missile having ram air inlet passage 2 leading to a super-charger 5. An air outlet passage 7 leads from the super-charger to a combustion chamber 8 of conventional type. An exhaust passage 9 leads from the combustion chamber to a turbine 10. A jet exhaust passage 11 leads from the turbine 10. The turbine 10 drives through a shaft 14 the blades of the supercharger 5. A conduit 16 is arranged so as to supply fuel to a suitable fuel nozzle in the combustion chamber 8 as will be explained hereinafter, while a fuel control mechanism is affected by ram air pressure through a pressure sensing line 18 opening from the air inlet passage 2.

Referring to the drawing of Figure 2, there is shown one form of the control mechanism which is indicated generally by the numeral 20.

The proposed emergency fuel control system is designed for use in jet propelled aircraft to operate in conjunction with an emergency fuel pump, indicated in Figure 2 by the numeral 22, arranged to maintain engine speed in the event of failure of a main fuel supply system, including fuel supply tank 23, booster pump 24, fuel conduit 26, filter 28, fuel conduit 29, main pump 30, fuel conduit 31, main control 32, fuel conduit 33, fuel throttle valve 34, fuel conduit 35, shut off valve 36 for main fuel supply system, fuel conduit 37, and check valve 38 permitting fuel flow in the direction of the arrow only to fuel nozzle line 16.

A manually operable main control lever 39 is interlinked to the shut off valve 36 and the throttle valve 34, as shown schematically in Figure 2.

The emergency pump 22 supplies fuel from the tank 23 to a fuel conduit 40. A relief valve 41 permits flow from pump 22 to tank 23 only when the output pressure of pump 22 exceeds a predetermined safe value. The fuel conduit 40 is connected to filter 42 and through fuel conduit 44 and conduit 46 to the control mechanism 20, as will be explained hereinafter.

Operation of the control mechanism 20 is based on balancing the fuel nozzle pressure at line 16 against the ram air pressure at the air inlet 2 so as to control a by-pass valve 50 in the discharge line 46 of the emergency pump 22. The discharge line 46 may be connected to the fuel nozzle conduit 16 through conduit 52 and check valve 54 so as to permit fuel flow in the direction of the arrow only from the control mechanism 20 to the nozzle conduit 16.

The control mechanism 20 is designed to cut the emergency pump 22 automatically into the fuel nozzle line 16, whenever the fuel nozzle pressure decreases and approaches a pressure corresponding to a preselected percentage of the turbine rotor speed. The control mechanism 20 will function at any setting of the throttle 34 and may be manually operated in the event of failure of the main fuel supply system through a linkage to a main control lever to control the turbine speed at any desired point.

Actual test data shows that the calculated fuel requirements in terms of nozzle pressure plotted against ram or inlet air pressure is essentially linear for any given turbine rotor speed, as shown in Figure 4.

This linear relationship makes it possible to balance the two pressures through a straight lever mechanism. The control mechanism 20 uses the fuel nozzle pressure at line 16 both as a sensing means and a control means. The use of the nozzle pressure insures automatic operation in the event of failure of any component of the main fuel system between the tank 23 and fuel nozzle supply line 16.

The control mechanism 20 includes a casing 55 in which there is provided an evacuated diaphragm or bellows 57 affixed at one end within the casing 55 by a bolt 59. The opposite end of the bellows 57 and a spring 59 operate on a lever 61 mounted and pivoted on a flexible partition 63 to balance force from a piston 65 having a roller 67 cooperating with a cam surface 68 formed on the lever 61.

The partition 63 also serves as a separator between a chamber 69 subjected through conduit 18 to ram air pressure and a chamber 71 which is connected to fuel drain pressure through a drain line 73 leading to supply tank 23.

Piston 65 is slidably mounted in a cylinder 75 formed in a member 77 pivotally mounted at 79 within the chamber 71. The piston 65 is biased upwardly under force of a spring 81 and the lower end of piston 65 is acted upon by fuel pressure in fuel nozzle line 16 and just upstream of the fuel nozzle. The cylinder 75 is connected through a flexible conduit 83 and conduit 85 to the fuel nozzle line 16. The piston 65 is mechanically connected to the lever 61 through roller 67 and cam surface 68.

The member 77 is pivotally mounted at 79 and mechanically connected through linkage 87, arm 89, and linkage 91 to the main fuel throttle control lever 39 as indicated by dotted lines in Figure 2. Thus by manually pivoting the member 77 the effective ratio between ram air and nozzle pressure may be varied with the setting of the throttle valve 34 to compensate for variation in fuel requirements at different speeds of the turbine 10 and supercharger 5.

Normally, while the main fuel system is functioning properly the nozzle pressure will force the piston 65 upward so as to cause lever 61 to hold pilot valve 95 controlled thereby open.

The pilot valve 95 controls the operation of by-pass valve 50 slidably mounted in a cylinder 97 formed in the casing 55. Fluid pressure medium supplied by line 44 is applied to opposite ends of the cylinder 97 through a conduit 99. The conduit 99 has ports 100 and 101 which open into the cylinder 97 at its opposite ends. There is further provided in conduit 99 between the ports 100 and 101 a metering orifice 103. A spring 105 biases the by-pass valve 50 downward against the pressure of the servo fluid applied through opening 100. The pilot valve 95 controls valve passage 104 and thereby the servo fluid applied to the opposite end of the by-pass valve 50 through opening 101.

The opening of passage 104 by valve 95 permits the servo fluid above the valve 50 (which is supplied through metering orfice 103) to escape and reduce the operating pressure above the valve 50. The valve 50, subject to full servo pressure at the lower end, will be forced upward against spring 105 opening a valve passage 109 and permitting fuel from the emergency pump 22 and supplied through conduit 46, valve cylinder 112 and passage 114 to be by-passed back to the supply tank 23 through passage 109, lower end 116 of the cylinder 112 and drain conduit 118.

If the nozzle pressure at line 16 drops and approaches the emergency control setting the pilot valve 95 will be closed through action of the piston 65 which is biased downwardly under force of spring 59 upon decrease in the nozzle pressure applied through line 85.

The closing of valve 95 causes the servo pressure on each end of the valve 50 to equalize and allows the spring 105 to move the valve 50 down, closing the valve port 109 and directing the emergency fuel to the nozzle supply line 16 through conduit 52 and check valve 54.

The control mechanism 20 thus operates to maintain the nozzle pressure at the emergency setting within the capabilities of the emergency pump 22 until or unless the main supply line again builds up sufficient pressure.

A three position selector valve 120 is slidably mounted in the cylinder 112 and held in the normal operating position shown in Figure 2 by the springs 122 and 124 which act through buttons 126 and 128 respectively on pivotally mounted lever arm 130 operatively connected through link 131 to selector valve 120. The lever arm 130 may be connected through link 132 for manual actuation or the same may be actuated upwardly or downwardly by suitable solenoids shown schematically in Figure 2 and indicated by numerals 134 and 135 and which may be selectively energized through circuits including a source of electrical energy or battery 137 and selector switches 139 and 141.

In the position shown, with the solenoids 134 and 135 de-energized, the fuel line 46 from the emergency pump 22 is connected to the fuel nozzle supply line 16 through line 52 as regulated by the servo-operated by-pass valve 50 in response to a selected ratio between inlet ram pressure as sensed by bellows 57 and fuel nozzle pressure as sensed by piston 65. The adjustment of the member 77 through linkage 87, 89 and 91 as explained will determine the selected ratio.

For starting the turbine 10 under any condition, a manually operated electrical switch in the pilot's cabin and indicated by the numeral 139 may be closed to energize the solenoid 134 for actuating the selector valve 120 to a downward position so as to connect the line 46 from the emergency pump 22 to the throttle valve 34, inlet conduit 33, through a conduit 134, which is normally closed by a portion 136 of the selector valve 120. A portion 138 of the selector valve 120 is also actuated downward with the selector valve 120 so as to close conduit 52 while portion 136 opens conduit 134 and closes passage 109 of the throttling valve 50.

In the latter downward position of selector valve 120, the fuel from the emergency pump 22 is delivered to the main throttle valve 34 through conduits 46, 134 and 33, thus adding to the fuel delivered by the main fuel supply pump 30.

The emergency fuel supply system may be cut out entirely by closing another electrical switch in the pilot's cabin indicated by the numeral 141 to selectively energize the second solenoid 135 to actuate the selector valve 120 from the position shown to an upward position at which position the portion 136 of valve 120 closes conduits 46, 114 and 134 so that fluid output from the emergency pump 22 is connected to the drain line 73 through relief valve 41.

As a final fall-back control, the selector valve 120 may be placed in the lower start position, which will direct fuel to the main throttle valve 34 and permit the speed of turbine 10 to be controlled by the main throttling valve 34 from idling to the full emergency speed.

*Modified form of the invention*

A modified form of the invention is shown in Figure 3 in which like numerals in the schematic showing indicate corresponding parts to those indicated in Figure 2 and previously described.

In the control mechanism indicated generally by numeral 220, there is provided in a casing 255 an evacuated diaphragm or bellows 257 affixed at one end to the casing 255 by a bolt 259 and positioned within a chamber 260 formed within a casing 261. The bellows 257 is operatively connected through an actuating rod 263 to arm 265 of a lever 267 which is pivoted at 269 and biased in a clockwise direction by a spring 271 so as to actuate an arm 273 in a downward direction against upward force exerted by a piston 275 through arm 277. The arm 277 is pivoted at 279 and operatively connected to arm 273 through a slidably mounted ball cage 281 including caged ball bearings 282 and 283 which act as a mechanical thrust member between levers 277 and 273. Thus the ratio of lever arms 273 and 277 may be varied by moving the caged ball bearings 282 and 283. By operatively connecting the ball cage 281 through links 285, 287 and 289 to the pilot's main throttle control lever 39, the setting of the emergency control mechanism 220 is varied with the adjustment of the main fuel throttling valve 34 by the pilot. A screw 290 mounted in casing 255 and adjustable exteriorly thereof is arranged to limit the counter-clockwise movement of arm 273.

The bellows 257 is subject through conduit 18 to the ram air inlet pressure at 2 and the force from bellows 257 is transmitted through a bellows 290 and 292 which act as a flexible pressure seal between chamber 260 under ram air pressure and chamber 295 within casing 255 and subject to drain fuel pressure.

Fuel pressure at line 16 and just upstream of the fuel nozzle is connected through line 85 to chamber 297 immediately below piston 275 so that any change of nozzle pressure results in a proportional change of force exerted by piston 275.

Slidably mounted in a cylinder 299 formed in the casing 255 of the control mechanism 220 is a control valve 300 subject to servo fluid pressure supplied by the emergency pump 22 through conduit 44. The conduit 44 is connected to passage 301 having a restriction or metering orifice 303 opening into passage 304. Passage 305 leads from the passage 301 to one end of the control valve 300 to supply a fluid pressure medium to the relatively small surface area 307 at the left end of the valve 300.

A passage 309 leads from the passage 304 so as to supply a fluid pressure medium to the relatively large surface area 311 at the right end of the valve 300.

The fluid pressure applied through passage 309 is regulated by a valve opening 313 leading from passage 304 into the interior 295 of the casing 255. A valve member 315 positioned by arm 317 of the lever 267 regulates the valve opening 313.

During normal operation, while the main fuel system is functioning properly, the nozzle pressure at line 16 will be high enough to force the piston 275 upward and hold the pilot valve 315 open. The resulting flow through valve opening 313 causes a pressure drop through orifice 303 decreasing the pressure on the right end 311 of the control valve 300 allowing the pressure at 307 to hold the valve 300 over to the right. In this position of valve 300, delivery from the emergency pump 22 is by-passed from conduit 46 through a port 320, valve passage 321 and out a by-pass port 323 and through conduit 325 to the inlet 29 of the main pump 30.

Should any failure occur in the main fuel supply system causing the nozzle pressure at line 16 to drop and approach the emergency control setting the piston 275 will move down under the force of spring 271 causing arm 317 of the lever 267 to move valve 315 so as to close the valve opening 313.

The servo pressure at 311 will then increase and due to the greater area of surface 311 over that of the surface 307 the control valve 300 will move toward the left. As valve 300 moves toward the left, the by-pass port 323 will be gradually closed by a valve land 326 affixed to valve 300, while a port 327, connected through conduit 52 and check valve 54 to nozzle line 16, will be gradually opened by a valve land 329 likewise affixed to the valve 300. Thus the fuel supplied through line 46 by the emergency pump 22 will be directed through port 320, a valve passage 331 and port 327 to the nozzle supply line 16.

The bellows 257, spring 271 and piston 275 will thus operate through the lever arm 267 the pilot valve 315 so as to regulate the valve 300 to maintain nozzle pressure at the emergency setting within the capabilities of the emergency pump 22 until the main control system again builds up sufficient pressure.

There are further incorporated in the control mechanism 220 additional controls for use during the engine starting cycle and for shutting off the emergency control mechanism 220.

An electromagnet 341 is mounted within the casing 255 and arranged to actuate through an armature 343 a pilot valve 345 which is normally biased to the position shown in Figure 3 by a spring 347. Energization of the electromagnet 341 is controlled by a suitable manually operable switch 351 in the pilot's cabin.

Upon energization of the electromagnet 341, the pilot valve 345 is actuated to an upward position at which position valve portion 353 opens passage 305 to chamber 295, while valve portion 354 closes passage 301 to passage 305. Drain conduit 73 leads from chamber 295 to the supply tank 23.

Thus the fluid pressure applied to the surface area 307 is decreased through the opening of passage 305 to drain by the valve portion 353 without decreasing the fluid pressure applied at surface area 311.

The control valve 300 under force of the fluid pressure medium applied at surface area 311 is then actuated to the extreme left position. In the latter position a valve land 355 affixed to valve 300 closes the nozzle port 327, while by-pass port 323 is closed by valve land 326. The valve land 326 in movement to the latter position further opens a port 357 connected through conduit 359 and check valve 361 to the throttle valve inlet conduit 33.

Thus upon the positioning of the valve 300 to the extreme left position, the fuel supply line 46 from the emergency pump 22 is connected through port 320, valve passage 363, port 357, conduit 359, and check valve 361 to the throttle valve inlet conduit 33 so as to supplement the fuel from the main pump 30.

After the engine or turbine 10 has reached idle running speed, the pilot may open switch 351 to de-energize the solenoid 341, whereupon the valve portion 353 is returned to the position shown by spring 347 and the emergency control mechanism 220 is once again in normal operating condition.

To prevent overshooting of control valve 300 during normal operation the valve 345 includes at its lower end a mechanical stop portion 365 which drops into a position in cylinder 299 so as to limit the extent of movement of valve land 329 and thereby the leftward movement of valve 300 upon de-energization of the electromagnet 341.

A second electromagnet 371 is also mounted within the casing 255 and arranged to actuate through an armature 373 a pilot valve 375 which is normally biased to the position shown in Figure 3 by a spring 377. Energization of the electromagnet 371 is controlled by a suitable manually operable switch 379 in the pilot's cabin.

Upon energization of the electromagnet 371, the pilot valve 375 is actuated to an upward position at which position a valve portion 381 opens passage 309 to chamber 295 while valve portion 382 closes passage 304 to passage 309 and opens passage 304 to chamber 295 through passage 385 so as to decrease the pressure applied at surface 311 of the valve 300 and effect the movement of valve 300 to the extreme right position. Chamber 295 is drained by conduit 73 to the supply tank 23.

Thus the emergency fuel flow from line 46 of pump 22 may be positively shut off from the nozzle line 16 by energizing the electromagnet 371 which operates pilot valve 375 so that pressure at surface 311 is drained. The control valve 300 will then be positioned to the extreme right and the emergency pump delivery through line 46 connected through port 320, valve passage 321, port 323 and conduit 325 to the inlet conduit 29 of the main pump 30 as shown in Figure 3.

A suitable drain passage 387 leads from the left end of the cylinder 299 and lower end of the pilot valve 345 to the chamber 295 to take care of leakage fluid from pilot valve 345 and valve 300.

It will be seen from the foregoing that the novel control mechanism of Figures 2 and 3 provides means for regulating the nozzle pressure directly. Further by mechanically setting the ratio between ram and nozzle pressure, there is provided a more exact correlation between engine fuel requirements and the fuel delivered.

Although only two embodiments of the invention have been illustrated and described, various changes in the form and relative arrangements of the parts may be made to suit requirements.

What is claimed is:

1. For use in a fuel system for an aircraft engine having an air inlet, a fuel supply nozzle, a main fuel pump and an emergency fuel pump for supplying fuel to said nozzle; a control mechanism, comprising, in combination, fuel nozzle pressure responsive means, air inlet pressure responsive means, a valve to control the connection of said emergency fuel pump to said fuel nozzle, means operatively connecting said first and second mentioned means to said valve, said valve effecting a direct connection of said emergency pump to said fuel nozzle upon the fuel nozzle pressure decreasing to below a selected fuel pressure-air inlet pressure ratio, and said valve effecting the connection of the emergency pump to the input of said main pump upon the fuel nozzle pressure increasing to a value in excess of said selected pressure ratio.

2. For use in a fuel system for an aircraft engine having an air inlet, a fuel supply nozzle, a fuel pump for supplying fuel to said nozzle, a control mechanism, comprising, in combination, fuel nozzle pressure responsive means, air inlet pressure responsive means, a valve to regulate the supply of fuel from said pump to said fuel nozzle, control means for said valve, means operatively connecting said first and second mentioned means to said control means, said fuel pressure responsive means including a pivotally mounted member, a fuel nozzle pressure responsive piston carried by said member, and means to adjustably position said member to vary the relationship of said piston to said operative connecting means and thereby the selected pressure ratio.

3. For use in a fuel system for an aircraft engine having an air inlet, a fuel supply nozzle, a fuel pump for supplying fuel to said nozzle, a control mechanism, comprising, in combination, fuel nozzle pressure responsive means, air inlet pressure responsive means, a valve to regulate the supply of fuel from said pump to said fuel nozzle, control means for said valve, means operatively connecting said first and second mentioned means to said control means, said fuel pressure responsive means including an adjustably positioned member to vary the relationship of said fuel nozzle pressure responsive means to said operative connecting means and thereby the selected pressure ratio.

4. For use in a fuel system for an aircraft engine having an air inlet, a fuel supply nozzle, a fuel pump for supplying fuel to said nozzle, a control mechanism, comprising, in combination, fuel nozzle pressure responsive means, air inlet pressure responsive means, a valve to regulate the supply of fuel from said pump to said fuel nozzle, control means for said valve, means operatively connecting said first and second mentioned means to said control means, said fuel pressure responsive means including a pivotally mounted member, a fuel nozzle pressure responsive piston to affect said member, and an adjustable roller bearing cage between said member and said operative connecting means to vary the relationship of said piston to said operative connecting means and thereby the selected pressure ratio.

5. In a fuel system for an aircraft engine having an air inlet and a fuel supply nozzle, the combination, comprising, a main fuel supply system for said nozzle including a main pump, an emergency fuel supply system for said nozzle including an emergency pump, a main fuel throttling valve for said main supply system, an auxiliary valve for controlling said emergency fuel supply system, fuel nozzle pressure responsive means, air inlet pressure responsive means, and operative means for connecting said first and second mentioned means to said auxiliary valve, said auxiliary valve arranged to effect a direct connection of said emergency pump to said fuel nozzle upon the fuel nozzle pressure decreasing to below a selected fuel pressure air inlet pressure ratio, and said auxiliary valve operatively affected by said first and second mentioned means so as to regulate said fuel nozzle pressure to maintain said selected pressure ratio, and a single control member to adjust said main throttling valve and simultaneously vary said selected pressure ratio.

6. The combination defined by claim 5 including manually operable means for selectively connecting said emergency pump to the inlet of said main fuel throttling valve.

7. The combination defined by claim 5 including manually operable means for selectively connecting said emergency pump to the inlet of said main pump.

8. The combination defined by claim 5 including manually operable means for alternatively connecting said emergency pump to the inlet of said main fuel throttling valve or to the inlet of said main pump.

9. The combination defined by claim 5 including servo motor means to adjustably position said auxiliary valve so as to selectively connect said emergency pump to the inlet of said main fuel throttling valve or to the inlet of said main pump, and manually operable means to control said servo motor means.

10. For use in a jet engine having a combustion chamber, a supercharger for supplying air to said combustion chamber, a ram air inlet to said supercharger, a turbine driven by the exhaust gas from said combustion chamber, said turbine drivingly connected to said supercharger, a fuel nozzle in said combustion chamber, a main pump for supplying fuel to said nozzle, and an emergency pump for supplying fuel to said nozzle; a fuel control mechanism comprising, in combination, a valve for regulating the fuel supply from said emergency pump to said fuel nozzle, a first member responsive to the ram air pressure, a second member responsive to the fuel nozzle pressure, a lever arm for operatively connecting the first and second members, a pilot valve controlled by said lever arm for varying the position of said regulating valve so as to maintain a predetermined ratio between the nozzle pressure and said ram air inlet pressure upon the pressure of the fuel supplied by said main pump being less than said ratio.

11. The combination defined by claim 10 including an adjustable throttling valve for controlling the fuel output from said main pump, datum changing means for varying the relationship of said lever arm to said first and second members so as to change said predetermined ratio, a single pilot's control lever, and means operatively connecting said control lever to said throttling valve and datum changing means so that the same may be simultaneously adjusted.

12. For use in a fuel system for an aircraft engine having an air inlet, a fuel supply nozzle, a main fuel pump and an emergency fuel pump for supplying fuel to said nozzle; a control mechanism, comprising, in combination, fuel nozzle pressure responsive means, air inlet pressure responsive means, a by-pass valve to regulate the supply of fuel from said emergency fuel pump to said fuel nozzle, control means for the by-pass valve, means operatively connecting said first and second mentioned means to said control means, said by-pass valve regulating the supply of fuel from said emergency pump to said fuel nozzle upon the fuel nozzle pressure decreasing to below a selected fuel pressure-air inlet pressure ratio, and said valve by-passing fuel from the emergency pump to the input of said main pump upon the fuel nozzle pressure increasing to a value in excess of said selected pressure ratio.

References Cited in the file of this patent

UNITED STATES PATENTS

| | | |
|---|---|---|
| 2,112,607 | Pooley | Mar. 29, 1938 |
| 2,165,985 | Schwentler | July 11, 1939 |
| 2,405,888 | Holley | Aug. 13, 1946 |
| 2,417,215 | Satterlee | Mar. 11, 1947 |
| 2,457,595 | Orr | Dec. 28, 1948 |